plitude dependent upon the duty-cycle of the waves $e_5$ and $e_6$ respectively. More precisely, for lossless filters:

$$e_7=\frac{4E}{\pi}\cos\theta\sin\omega t$$

$$e_8=\frac{4E}{\pi}\sin\theta\sin\omega t$$

where E represents the constant amplitude of the rectangular pulses and $\omega$ is the radian frequency of the A.C. reference voltage.

Assuming infinite gain amplifiers with 180° phase reversal, the voltages applied to the Scott transformers are:

$$e_a=-\frac{4E}{\pi}\cdot\frac{R_2}{R_1}\cos\theta\sin\omega t$$

$$e_b=-\frac{4E}{\pi}\cdot\frac{R_2}{R_1}\sin\theta\sin\omega t$$

Letting A equal a constant, the resulting output voltages of the Scott transformer become:

$$S_3-S_1=A\sin\theta\sin\omega t$$

$$S_1-S_2=A\sin(\theta-120°)\sin\omega t$$

$$S_2-S_3=A\sin(\theta+120°)\sin\omega t$$

These voltages are suitable to drive the synchro receiver as indicated in FIG. 1.

The operation of the converter may be understood by referring to the various circuit diagrams and the graphs of FIG. 4. Assume that the unknown input angle $\theta$ is that depicted in FIG. 4 and equal to 22.5°.

The operation of the over-all converter may best be understood by first considering the operation of the comparator circuit of FIG. 2 under these conditions.

With an angle of 22.5° stored in the register 11, each stage except the $2^6$ stage will be in the ZERO state. That is, the counter will contain the following binary number:

0000001000

The count of the counter 15, of course, will be continually changing in accordance with the changing voltage from the A.C. reference 18. However, it will be instructive to first consider conditions at the time that the angular displacement of the A.C. reference voltage is zero. At this time, each stage of the binary counter 15 is in the binary ZERO state. As the angular displacement of the A.C. reference voltage increases, the count in the counter also increases.

It will be remembered from the foregoing table of logic expressions that either a $K_a$ or $K_b$ signal from the AND gates 25 or 27 is required before any of the AND gates 37 can produce an output signal. A $K_a$ signal, however, is produced only when each of the stages $2^0$ through $2^7$ in the counter agree with the corresponding stages in the register. Similarly, a $K_b$ signal is produced only when each of these pairs of stages is in a different state. Therefore with the assumed angle $\theta$, no output signal is provided by the AND gates 37 until the counter reaches the state that agrees with the state of the register. At this instant, the state of each stage in the counter agrees with that of each corresponding stage in the register, whereupon a $\theta$ pulse is produced at the uppermost gate 37. This indicates that the counter 15 at that instant contains a count equivalent to the unknown angle $\theta$.

As the angular displacement of the A.C. reference voltage continues to increase, each of the AND gates 37 will be closed until the angular displacement becomes equal to the next specified function of the angle $\theta$. For the assumed angle of 22.5°, this will occur at $(-\theta+90)$ or 67.5°. For an angle of this magnitude, the counter will be in the 1111110100 state, whereas the register 11 remains in the 0000001000 state.

Thus, only the $2^8$ and $2^9$ counter stages agree with the corresponding register stages. In this situation, the AND gate 27 is opened and a $K_b$ signal is produced. Since the $2^8$ stages agree, a $K_8$ signal is also produced.

Since both the $2^8$ and $2^9$ counter stages are in the binary ZERO state, the first quadrant comparator 29 produces no output. However, this permits an inverted signal to flow from the inverter circuit 33.

Since the $2^9$ stage of register 11 is in the binary ZERO state, corresponding input terminals of the second quadrant comparator 31 will be energized and this comparator will produce a $(K_9-90)$ signal.

Since $K_b$, $K_8$ and $(K_9-90)$ signals are available, the bottom AND gate 37 as depicted in FIG. 2 will be opened, and a $(-\theta+90)$ signal will be produced, thus indicating that at this time, the angular displacement of the reference voltage is equal to that function of the unknown angle $\theta$.

By continuing in this fashion, it can readily be shown that successive AND gates in the bank 37 will be opened momentarily as the angular displacement of the reference voltage sweeps through values equal to the specified functions of $\theta$.

These pulses are applied to the appropriate flip-flops as indicated in FIG. 3.

The operation of the waveform generator of FIG. 3 may be understood by referring to that figure together with the corresponding graphs of FIG. 4.

Assuming the same unknown angle of $\theta=22.5°$, consider the situation when the angular displacement of the A.C. reference voltage is zero. Flip-flops 53 and 65 will then be in the state that produces $e_2$ and $e_3$ voltages, respectively, since these flip-flops had been previously switched to that state as the A.C. reference voltage swept through the $-\theta$ and $(\theta+270)$ displacements in the last completed cycle. At this time, flip-flops 47 and 67 remain in the state that produces $\bar{e}_1$ and $\bar{e}_4$ voltages.

Under these conditions, none of the AND gates 49, 51, 69 or 71 is open. The NOR gates 57 and 75 set the switches 55 and 73 to ground set condition and neither an $e_5$ nor an $e_6$ voltage is produced.

When the angular displacement of the A.C. reference voltage becomes equal to the input angle $\theta$, the comparator circuit of FIG. 2 produces a $\theta$ pulse that switches the flip-flop 47 of FIG. 3 to produce an $e_1$ voltage. AND gate 49 now receives both $e_1$ and $e_2$ voltages so as to produce a positive command signal to the switch 55. This establishes a positive $e_5$ voltage.

When a comparator circuit of FIG. 2 produces a $(-\theta+90)$ voltage, flip-flop 67 of FIG. 3 is switched and an $e_4$ voltage is produced. This voltage, together with the $e_3$ voltage already in existence, opens the AND gate 69 so as to establish a positive $e_6$ voltage at the output of the switch 73.

The angular displacement of the A.C. reference voltage next sweeps through $(\theta+90)$ or 112.5°. The flip-flop 65 is thereby switched so as to terminate the $e_3$ voltage and return the switch 73 to the ground set condition. This terminates the voltage $e_6$ as indicated in FIG. 4.

The angular displacement of the reference voltage continues to increase and it next sweeps through $(-\theta+180)$ or 157.5°. The flip-flop 53 is switched so as to terminate the $e_2$ voltage and return the switch 55 to the ground set condition. The voltage $e_5$ is thus returned to ground. The angular displacement of the reference voltage next becomes equal to $(\theta+180)$ or 212.5°. The corresponding voltage pulse produced in the comparator circuit of FIG. 2 switches the flip-flop 47 of FIG. 3 so as to terminate the $e_1$ voltage and produce $\bar{e}_1$ voltage so as to open gate 51. This produces a negative command signal which actuates the switch 55 so as to produce a negative $e_5$ signal as shown in FIG. 4.

The A.C. reference voltage next sweeps through the $(\theta+270)$ or 292.5° point. The comparator circuit produces a corresponding pulse which switches the flip-flop 65 and again produces an $e_3$ voltage. This closes the gate 71 and terminates the voltage $e_6$.

Shortly thereafter, the A.C. reference voltage sweeps

INVENTORS.
EDWARD P. CHESLOCK

BY *Meyer, Tilberry & Body*
ATTORNEYS

INVENTORS.
EDWARD P. CHESLOCK
BY Meyer, Tilberry & Body
ATTORNEY

INVENTORS.
EDWARD P. CHESLOCK

BY *Meyer, Tilberry & Body*
ATTORNEYS

United States Patent Office 3,488,654

Patented Jan. 6, 1970

3,488,654

MODULAR TRAFFIC DIRECTIONAL SIGNAL HAVING COMPOSITE DIRECTIONAL ELEMENTS

Edward P. Cheslock, Newtown Square, Pa., assignor to E. W. Bliss Company, Canton, Ohio, a corporation of Delaware Filed May 19, 1966, Ser. No. 551,260

Int. Cl. G09f *9/00;* B60q *1/00;* G08b *5/00*

U.S. Cl. 340—381 4 Claims

ABSTRACT OF THE DISCLOSURE

There is provided a modular directional signal including a lens structure being divided into a plurality of generally triangular lens modules each defining a portion of the lens structure, and at least one of the lens modules being substantially contiguous with another of the modules. The lens modules take the form of an arrowhead having a pointed end portion pointing in a different direction from that of the other modules, and a separately energized light source is associated with each module for illuminating the module to display a directional command.

This invention relates to the art of traffic control and, more particularly, to a traffic directional signal of modular construction.

The invention is particularly applicable for use in conjunction with a system for routing aircraft ground traffic through an airport's runway and taxiway intersection network, as described and claimed in copending United States application, Ser. No. 565,462, filed July 15, 1966, assigned to the same assignee as the present invention, and which application is herein incorporated by reference. This invention, however, is not limited to a system as described in that application and may, for example, be used in conjunction with displaying visual traffic command signals to automobile traffic.

Traffic signals known heretofore normally include a housing supporting three spaced lenses lying in a vertical plane. The lenses for a common automobile traffic signal are normally circular shaped and aligned either in a vertical or horizontal row. The lenses are normally of different colors: red, for displaying a stop command; amber, for displaying a caution command; and, green, for displaying a go command. A light bulb is mounted in the housing behind each lens for illuminating the associated lens. Such traffic signals, however, do not communicate directional commands, but only movement commands. An additional lens having suitable masking to define an arrow is normally required for each directional command to be displayed by the traffic signal. Thus, the traffic signal housing and total signal area defined by the lenses must be increased in size to accommodate the number of additional lenses required for displaying different directional commands.

Signals have been proposed which include a lens shaped as an arrow including a pointed head portion and a tail portion so that when the lens is illuminated it displays a directional command. However, when viewed from a distance the head and tail portions of such a signal frequently appear as a circle whereby the illuminated directional command is not apparent to the viewer.

Compartmentalized signals, having a plurality of masked lenses each covering a separate electric lamp enclosed compartment, have been proposed in the past. In such signals, normally used as automobile taillights, a selected compartment lamp is energized to illuminate its associated lens for displaying a legend or nondirectional command in accordance with the masking on the lens. However, no such signal known heretofore provides for selective energization of one, two, or more, compartment lamps to provide different directional commands.

The noted disadvantages, and others, of such previous signals are overcome by the present invention which provides a signal having a compact signal area of modular construction including a plurality of lens modules, each shaped as an arrowhead to provide different directional commands, and in which combinations of at least two lens modules provide additional directional commands. Thus by the present invention, maximum utilization is made of the signal area to provide a plurality of directional commands.

In accordance with the present invention, the signal includes a lens structure defining a lens signal area, the structure being divided into a plurality of arrow shaped lens modules each defining a portion of the signal area and each having a pointed end portion pointing in a different direction from that of the other modules, and a separately energized light source associated with each module for illuminating the associated module to display a directional command.

In accordance with a still further aspect of the present invention, the lens signal area is diamond shaped, defined by at least two triangular shaped lens modules each having an apex pointing in a different direction.

Still further in accordance with the invention, the diamond shaped lens signal area is defined by four lens modules each taking the form of a triangular quadrant of a square, with the 90° apexes of the modules being in adjacent relationship so that separate illumination of the modules provides four different directional commands and illumination of combinations of two adjacent modules provides four additional directional commands within the lens signal area.

The primary object of the present invention is to provide a directional traffic signal wherein maximum utilization is made of the lens signal area for displaying directional commands.

Another object of the present invention is to provide a directional traffic signal having directional lenses which provide an image which is more direct, easier to see and more graphic in directional command than previous traffic signals.

A still further object of the present invention is to provide an improved directional traffic signal wherein a plurality of different directional commands may be displayed within a compact lens signal area.

A still further object of the present invention is to provide a directional traffic signal which utilizes triangular shaped lenses having an inherent growth characteristic so that the lenses may be modulated to display various directional commands.

The foregoing and other objects and advantages of the invention will become apparent from the following description of the preferred embodiment of the invention as read in connection with the accompanying drawings, in which:

FIGURE 1 is a perspective view illustrating a display panel;

FIGURE 2 is a plan view illustrating the face of the display panel;

Figures 3, 4A, 4B, 5A, 5B, 6B:
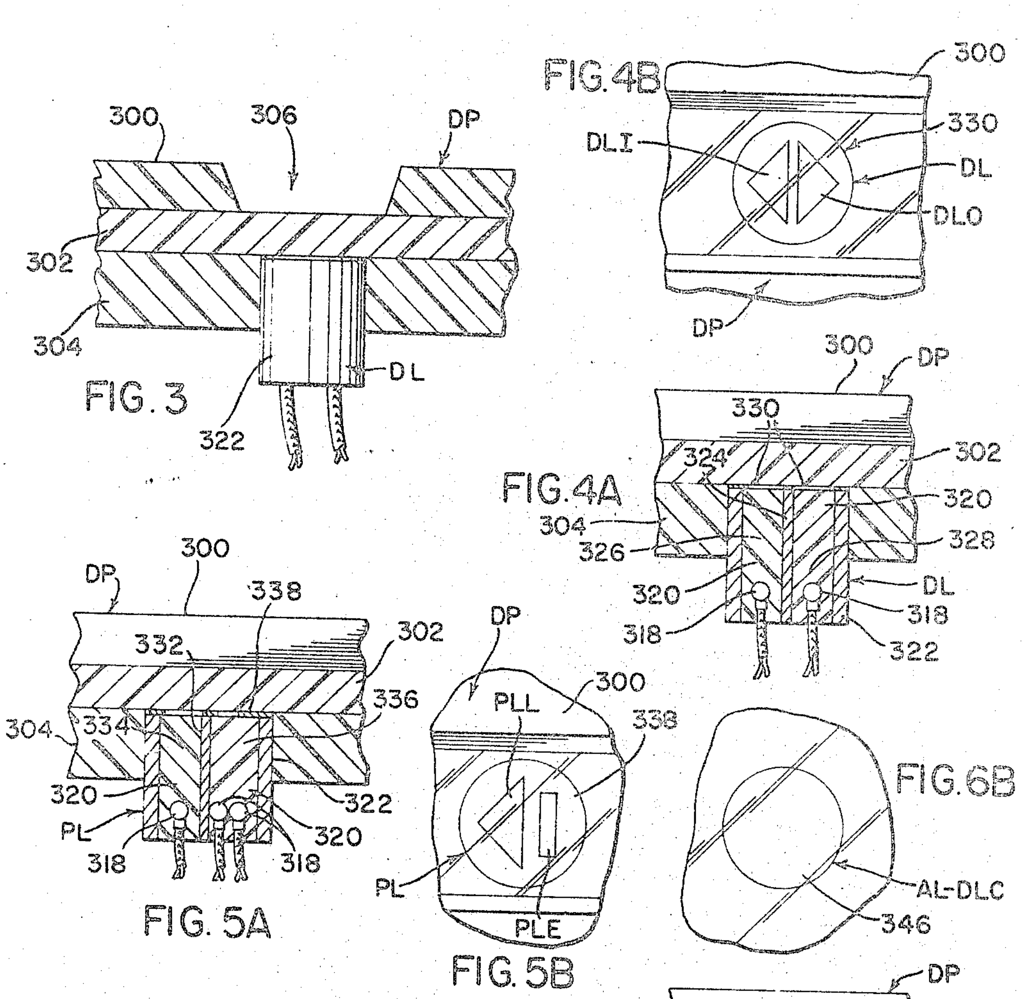
FIGURE 3 is a sectional view of the display panel taken along line 3—3 in FIGURE 2 looking in the direction of the arrows.
FIGURE 4A is a sectional view of a detector light module.
FIGURE 4B is a plan view of the detector light module illustrated in FIGURE 4A.
FIGURE 5A is a sectional view of a program light module.
FIGURE 5B is a plan view of the program light module illustrated in FIGURE 5A.
FIGURE 6B is a plan view of the alarm-intersection light module illustrated in FIGURE 6A.

Referring now to the drawings, wherein the showings are for the purpose of illustrating a preferred embodiment of the invention and not for purposes of limiting same, FIGURE 1 illustrates a display panel DP having a graphical representation on the panel face of an airport's runway and taxiway intersection network, and a magnetic stylus S which, as will be described in greater detail hereinafter, is used by a traffic director for tracing a programmed route on the display panel's network. The programmed route is representative of a desired route to be followed by an aircraft through the airport's actual runway and taxiway intersection network, illustrated in FIGURE 8.

DISPLAY PANEL

The display panel DP graphically illustrates the airport's actual taxiway and runway intersection network, including two typical intersections B and C, located as shown in FIGURE 2 with respect to north, south, west and east directions. Each intersection has a plurality of intersection arms extending outwardly from the intersection. Intersection C has north, south, east and west intersection arms and intersection B has a west intersection arm interconnecting with the east intersection arm of intersection C, an east intersection arm and a southwest intersection arm. These intersections and intersection arms correspond with the actual intersections and intersection arms shown in FIGURE 8.

An aircraft detector light module DL for each intersection arm is located in the panel arm adjacent a panel intersection. As will be described in greater detail hereinafter with respect to FIGURES 4A and 4B, each aircraft detector light module DL includes two portions, detector light in DLI and detector light out DLO. Detector light in DLI serves, when energized, to indicate to the traffic director that an aircraft has been detected on the actual intersection arm (FIGURE 8) and is heading toward the intersection. Similarly, detector light out DLO represents, when energized, that an aircraft has been detected on the actual intersection arm (FIGURE 8) and is heading away from the intersection.

A program light module PL is associated with each intersection arm and located in the panel intersection adjacent its associated arm. As will be described in greater detail hereinafter with respect to FIGURES 5A and 5B, each program light PL includes two portions, a program light enter portion PLE and a program light leave portion PLL. Program light portion PLE serves, when energized, to visually remind the traffic director that a program has been entered for a vehicle to enter the actual intersection from the associated intersection arm. Similarly, program light portion PLL serves, when energized, to visually remind the traffic director that a program has been entered for an aircraft to leave the actual intersection and proceed into the associated intersection arm.

Figure 8:
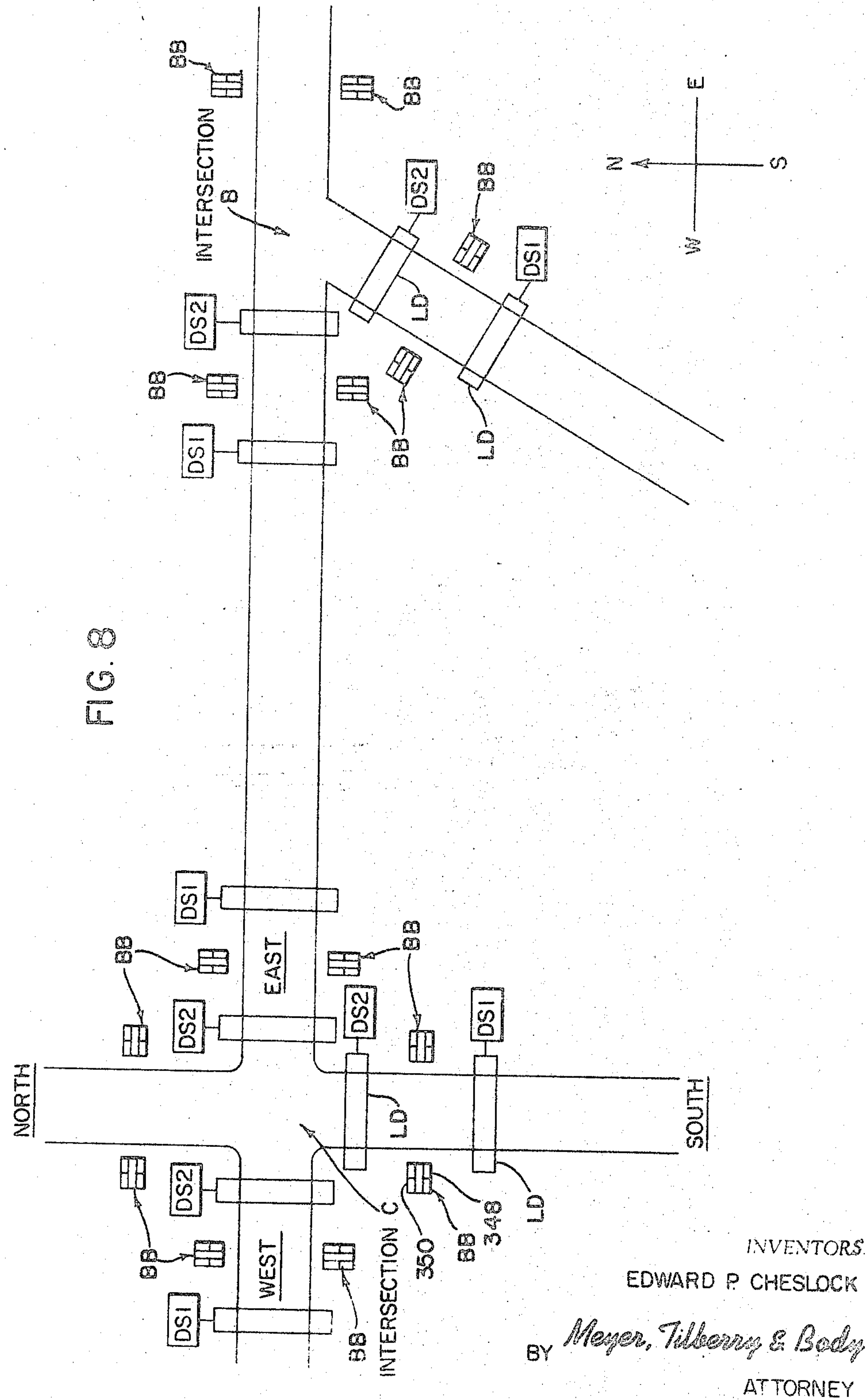
FIGURE 8 is an illustration of an airport's actual runway and taxiway intersection network.

At the center of each panel intersection there is provided a composite alarm-intersection light module AL-DLC, described in greater detail hereinafter with reference to FIGURES 6A and 6B. The intersection light DLC serves, when energized, to visually indicate to the traffic director that the actual intersection, see FIGURE 8, is occupied by an aircraft. The alarm light AL serves, when energized, to alert the traffic director by flashing on and off that an alarm condition exists, as will be discussed in greater detail hereinafter.

Each panel intersection arm is provided with two magnetic reed program switches PS1 and PS2, with the former being spaced further from the associated intersection than the latter, as illustrated in FIGURE 2. In addition, each panel intersection arm includes a magnetic reed program erase switch PES located at a point spaced further from the associated intersection than switch PS1. Spaced still further from the intersection than switch PES, and located at a point spaced transversely from the intersection arm, there is provided a magnetic reed detector erase switch DES.

Figure 7:
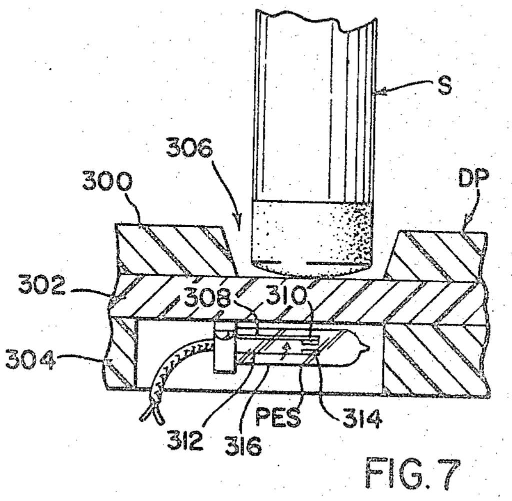
FIGURE 7 is a sectional view of the display panel taken along line 7—7 in FIGURE 2 looking in the direction of the arrows.

As illustrated in FIGURES 3 and 7, the display panel DP preferably takes the form in cross-section of three sandwiched plastic sheets, including a top sheet 300, an intermediate sheet 302 and a bottom sheet 304. The top sheet 300 is preferably sandblasted and opaque and has a cut out portion defining a groove 306. The groove 306, in turn, defines the panel's runway and taxiway intersection network, as is best shown in FIGURE 2. As shown in FIGURE 7, groove 306 also serves as a guide for the passage of the magnetic stylus S as the traffic director traces the stylus through the panel's runway and taxiway intersection network. Groove 306 is particularly advantageous for facilitating movement of the stylus S when tracing turn routes, for example, a turn route from the west arm to the south arm of intersection C, illustrated in FIGURE 2, as opposed to tracing a straight ahead route.

The program light module PL, detector light module DL and magnetic reed switches PS1, PS2, PES and DES for each intersection arm are preferably mounted on a printed circuit board and secured in corresponding cut out portions to bottom sheet 304 so that the modules are located directly beneath groove 306, and that the magnetic reed switches PS1, PS2 and PES are located directly beneath groove 306 and positioned as indicated in FIGURES 2 and 7. The detector erase switch DES is also located beneath sheet 302 but is spaced transversely away from groove 306, as illustrated in FIGURE 2. Each composite alarm-intersection light module AL-DLC is also mounted beneath sheet 302 directly beneath the center of a panel intersection, as illustrated in FIGURE 2.

The intermediate sheet 302 is translucent so that light from light modules PL, DL and composite light module AL-DLC may be transmitted upwardly through the sheet. Preferably, sheet 302 exhibits a light transmission characteristic on the order of 70% to permit observation of light from the light modules, while prohibiting observation of the magnetic reed switches PES, PS1 and PS2.

The magnetic reed switches PES, PS1, PS2 and DES may take the form such as that illustrated in FIGURE 7, wherein switch PES is shown as a normally open switch having a stationary contact arm 308 carrying an electrical contact 310 at a free end thereof, and a movable contact arm 312 carrying an electrical contact 314 of magnetic material at a free end thereof. Contact arm 312 is resiliently biased so that contact 314 is normally spaced both mechanically and electrically from contact 310. The contacts are enclosed by a glass envelope 316, to protect the contacts from damage and dust conditions. Envelope 316 is mounted so that contacts 310 and 314 are located directly beneath groove 306 with contact 310 being located closer to sheet 302 than is contact 314. In this manner, as stylus S traces a programmed route through groove 306 the magnetic field of the stylus attracts the magnetic material of contact 314, so that contact 314 mechanically and electrically engages contact 310, closing switch PES. Magnetic reed switches PS1 and PS2 are mounted in the same manner as is switch PES. Detector erase switch DES, however, is mounted at a point spaced transversely away from groove 306, as shown in FIGURE 2, so that it is not actuated by a stylus S tracing a programmed route through groove 306. Instead, switch DES must be actuated by removing the stylus from groove 306 and placing the stylus on the top surface of sheet 300 immediately above switch DES, for purposes as will be explained in greater detail hereinafter.

The magnetic switches are preferably mounted as close together as possible to reduce the size of the display panel, but the switches must be spaced apart by a sufficient distance that only one switch is actuated by stylus S at any one time. If desired, different magnetic reed switches may be used and mounted in a vertical plane, as opposed to the horizontal plane illustrated in FIGURE 7, to further reduce the size of the display panel.

LIGHT MODULES

Referring now to FIGURES 4A, 4B, 5A, 5B, 6A and 6B, there is illustrated the constructional details of the light modules illustrated in FIGURE 2. These light modules are described and claimed in Edward P. Cheslock's United States patent application, Ser. No. 551,308, filed May 19, 1966, assigned to the same assignee of the present invention.

Each light module includes two or three miniature, low voltage electric light bulbs 318, preferably embedded in a dyed, high temperature resistant polyester 320 and encapsulated by an aluminum sleeve 322. The aluminum sleeve acts as a heat sink to dissipate heat generated by the bulbs.

Each detector light module DL, FIGURES 4A and 4B, includes a divider 324 extending for a length equal to that of sleeve 322 and separating the sleeve into two compartments 326 and 328, each filled with polyester 320. The polyester 320 in compartments 326 and 328 is preferably dyed yellow so that a yellow signal light is transmitted through the polyester when bulbs 318 are energized. The upper surface 330 of detector light module DL is roughened for a diffusing effect and masked to provide two signal light portions DLI and DLO, each having a distinct directional configuration in the form of a triangular shaped arrowhead as shown in FIGURE 4B. Light portions DLI and DLO are oriented back to back so that the point, i.e., the 90° apex, of each arrowhead points in an opposite direction from that of the other arrowhead.

Each program light module PL, FIGURES 5A and 5B, includes a divider 322 extending for a length equal to that of sleeve 322 and separating the sleeve into two compartments 334 and 336, each filled with polyester 320. Polyester 320 in compartments 334 and 336 is preferably dyed green so that a green signal light is transmitted through the polyester when bulbs 318 are energized. The upper surface 338 of program light module PL is roughened for a diffusing effect and masked to provide two signal light portions PLL and PLE, each having a distinct configuration. As shown in FIGURE 5B, light portion PLL has an arrowhead configuration similar to that of light portions DLI and DLO, illustrated in FIGURE 4B, and light portion PLE has a rectangular bar-like configuration forming a tail for the arrowhead light portion PLL.

Figure 6A:
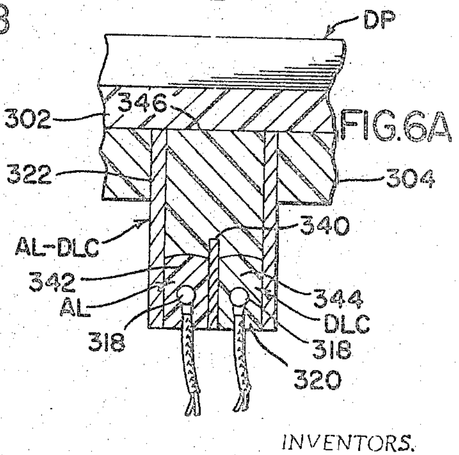
FIGURE 6A is a sectional view of an alarm-intersection light module.

Each alarm-intersection light module AL-DLC, FIGURES 6A and 6B, is constructed similar to the detector and program light modules, but includes a short divider 340 which does not extend for the length of sleeve 322. Divider 340 defines two short compartments 342 and 344, which in turn respectively define alarm light portion AL and intersection light portion DLC. Compartment 342 is filled with red dyed polyester and compartment 344 is filled with yellow dyed polyester, and the remaining portion of the sleeve is filled with clear, diffusing polyester. The top surface 346 of the module is abraded or roughened, but is not masked as in the case of the detector and program light modules, so as to provide a circular configuration, as shown in FIGURE 6B. With this construction, light transmitted from bulbs 318 in the alarm light portion AL and intersection light portion DLC may be tinted by the dyed polyester compartments 342 and 344 and then be diffused through the clear polyester and displayed over the entire abraded surface 346 of the light module.

AIRCRAFT DETECTORS

Referring now to FIGURE 8, there is schematically illustrated the actual runway and taxiway intersection network, which is graphically represented on the display panel DP illustrated in FIGURES 1 and 2 and, accordingly, like character references and like lengend are used in FIGURE 8 for identifying like intersections and like intersection arms. Aircraft detectors LD are provided for detecting the presence of aircraft in each intersection arm. Detectors LD take the form of loop detectors which normally comprise a loop, or loops, of current carrying conductors buried below a roadway surface. The loop configuration of each loop detector LD defines a detection area so that as a vehicle, such as an aircraft, enters the detection area, an electrical disturbance occurs in the loop conductor. This disturbance is utilized to close a set of relay contacts which remain closed so long as a vehicle is in the detection area. The detectors may also take the form of area sensitive, ultrasonic detectors or spot detectors in the form of treadle pads.

As illustrated in FIGURE 8, two loop detectors LD are provided for each intersection arm, with one loop detector being located at a first detector station DS1 and a second loop detector located at a second detector station DS2. Preferably, detector station DS2 is located adjacent an intersection. Detector station DS1 is spaced further from the intersection than is station DS2 so that as an aircraft approaches an intersection it is first detected at station DS1 and then at station DS2. A pair of aircraft traffic signals BB are located on opposite sides of each intersection arm. Preferably, as illustrated in FIGURE 8, signals BB are located with respect to detector stations DS1 and DS2 so that the signals for an intersection arm are visible to a pilot in an aircraft located at station DS1 but not visible to the pilot when the aircraft reaches station DS2.

AIRCRAFT TRAFFIC SIGNALS

Figure 10:
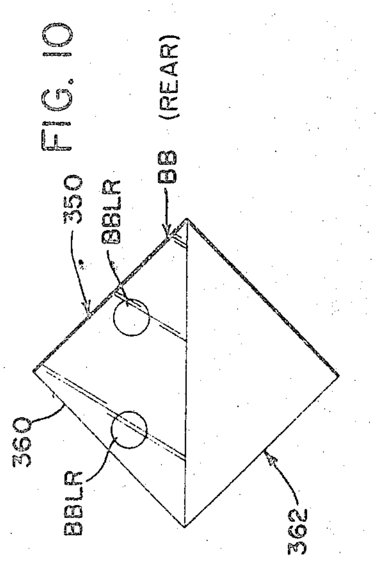
FIGURE 10 is a rear elevational view of the traffic signal illustrated in FIGURE 9; and, FIGURE 11 is a functional block diagram.
Figure 9:
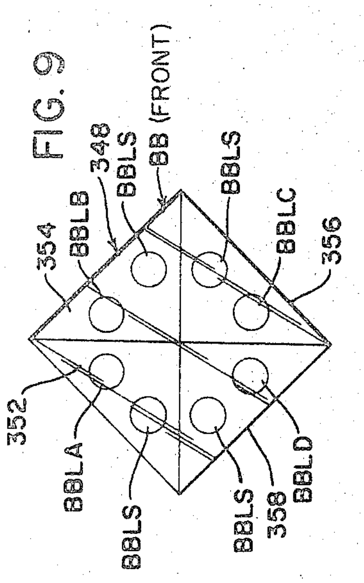
FIGURE 9 is a front elevational view of an intersection traffic signal constructed in accordance with the present invention.

In accordance with the present invention each traffic signal BB has a front diamond shaped face 348, shown in the elevational view in FIGURE 9, and a rear diamond shaped face 350, as shown in the elevational view in FIGURE 10. As illustrated in FIGURE 9, the front face 348 of each signal BB is compartmentalized into four signal lenses 352, 354, 356 and 358, each of which preferably is a triangular quadrant of a square, with the 90° apex of each lens located at the center of the signal face. Yellow lamps BBLA, BBLB, BBLC and BBLD are located within the signal BB immediately behind lenses 352, 354, 356 and 358, respectively. A red lamp BBLS is also located behind each lens. Lenses 352, 354, 356 and 358 may be transparent, with the background within the signal BB being black so that when none of the lamps is energized a black diamond shaped configuration is presented by signal face 348. When one of the yellow lamps is energized to illuminate one of the triangular shaped lenses, the 90° apex of that lens provides a visual directional command signal to an aircraft pilot. Thus, for example, when lamp BBLD, behind lens 358, is energized, the 90° apex of that lens indicates to an aircraft pilot that the aircraft should proceed into an intersection and make a half right turn. A full right turn is indicated by energization of lamps BBLB and BBLC behind lenses 354 and 356, respectively, so that the 90° apex of the triangle defined by the two lenses provides a visual directional command signal for an aircraft pilot to make a full right turn. Similarly, when lamps BBLA and BBLD are energized an aircraft pilot is presented with a visual command signal to make a full left turn when entering an intersection. Also, as is now evident, when both lamps BBLA and BBLB are energized an aircraft pilot is presented with a visual directional command signal to proceed straight through an intersection. Lamps BBLA, BBLB, BBLC and BBLD are selectively energized in accordance with a program entered by an airport ground traffic director, as will be described in greater detail hereinafter. All lamps BBLS are energized at the same time to provide a red diamond shaped visual command signal representative that an aircraft pilot is to stop and not proceed into an intersection until a yellow directional signal is displayed.

The rear side 350 of each traffic signal BB faces an intersection and includes a large triangular lens 360, which preferably takes the form of one-half of a square with its 90° apex pointed in an upward direction. Behind lens 360 there is provided at least one yellow pull through lamp BBLR. Due to the large lens surface area it may be desirable to provide two lamps BBLR, as shown in FIGURE 10. Since the rear side 350 of traffic signal BB faces an aircraft located in an intersection, the energization of lamps BBLR serves to provide a yellow visual command signal to an aircraft pilot representative that the aircraft should pull through the intersection, i.e., proceed through the intersection, into the intersection arm at which the pull through signal lamps BBLR are energized. The lower half 362 of the rear side 350 of each traffic signal BB is preferably colored black so that when lamps BBLR are energized only the upper lens 360 transmits a visual command signal to an aircraft pilot.

SYSTEM INTERCONNECTIONS

Figure 11:
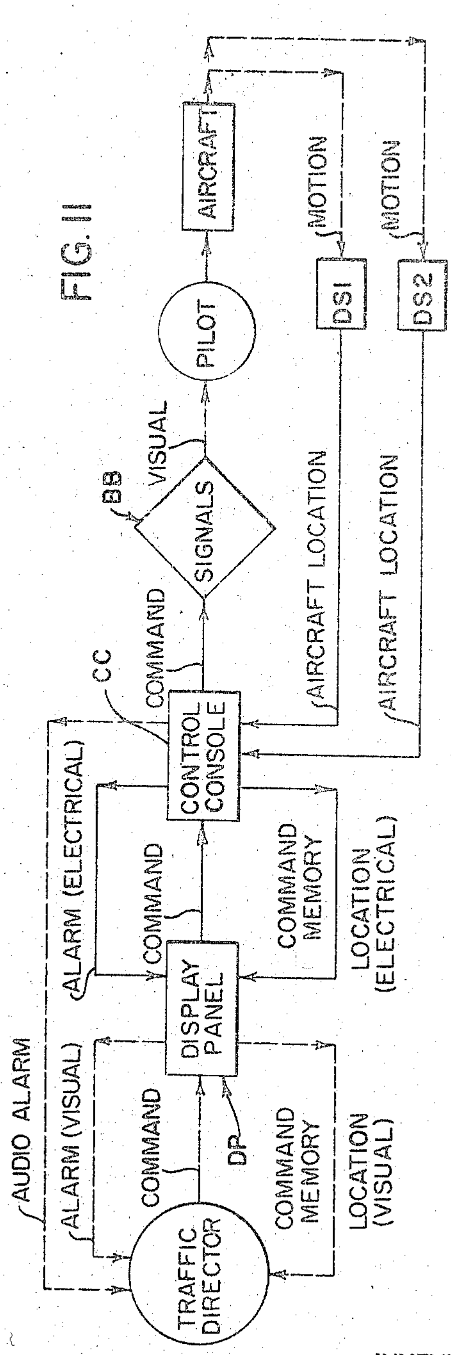

Referring now to FIGURE 11, there is shown a block diagram of the system's functional and electrical interconnections. The display panel DP, best shown in FIGURES 1 and 2, is electrically connected with a control console CC which includes electrical control circuitry. The control console CC is electrically connected with the traffic signals BB, best shown in FIGURES 8, 9 and 10. The detector stations DS1 and DS2, best shown in FIGURE 8, are electrically connected to the control console CC for relaying output signals representative of an aircraft's location on the actual network. The control console CC has a first electrical feedback alarm path connected with the display panel DP for energizing alarm lamps AL, as well as an audible alarm buzzer. The control console CC also includes a second electrical feedback path connected to the display panel for purposes of energizing program lamps PL, detector lamps DL and intersection lamps DLC.

OPERATION

Referring now to FIGURE 8, there is illustrated a four arm intersection C having north, east, south and west intersection arms. As an aircraft approaches the intersection from the west arm, it first crosses loop detector LD associated with detector station DS1. This energizes directional lamp DLI in the control panel's west arm (see FIGURE 2), indicating to a traffic director that an aircraft has been detected in the west arm and is proceeding in an easterly direction toward intersection C. The traffic director may enter a programmed route for the aircraft to proceed through intersection C by tracing a route with stylus S on the display panel DP, illustrated in FIGURE 2, from, for example, the west arm through the intersection C and thence in a southward direction through the south arm. The stylus S sequentially actuates program switches PES, PS1 and PS2 in the west arm and then sequentially actuates switches PS2, PS1 and PES in the south arm. Actuation of these switches results in various program lights being energized; namely, program taillight PLE associated with the west arm indicating that an aircraft may enter the intersection from the west arm, and program lights PLE and PLL of the light module associated with the south arm indicating that aircraft may proceed from the intersection C into the south arm. Thus, the energization of these lights serve as a memory for the traffic director as to the program entered. In addition, the actuation of these program switches energizes lamps BBLB and BBLC (see FIGURE 9) on the front face 348 of the traffic signals BB associated with the west arm, which provides visual directional command signals for the aircraft to enter the intersection C and make a full right turn. Actuation of the program switches in the south arm of the control panel energizes lamps BBLR on the rear side 350 of the traffic signals BB associated with the south arm, presenting visual directional command signals for the aircraft to pull through intersection C and proceed from the intersection into the south arm.

The aircraft proceeds into the intersection C actuating loop detector LD associated with detector station DS2 of the west arm. This de-energizes detector light DLI in the west arm of the display panel and energizes the intersection light DLC in the display panel at intersection C, indicating to the traffic director that the aircraft has left the west arm and is now present in the intersection.

As the aircraft proceeds into the south arm it crosses loop detector LD associated with detector station DS2 in the south arm. This de-energizes the intersection light DLC and energizes detector light DLO associated with the south arm on the display panel, representing to the traffic director that the aircraft has left the intersection and is proceeding into the south arm. At this point, the aircraft has proceeded exactly as instructed by the route programmed by the traffic director. If the aircraft proceeded into intersection C, as commanded by the programmed route, but continued straight ahead into the east intersection arm actuating detector station DS2 associated with the east arm, an audible alarm buzzer is energized to alert the traffic director as to the aircraft's noncompliance with the programmed route. In addition to the audible alarm, alarm lamp AL at the center of intersection C on the display panel is energized and alternately flashes on and off with a red signal indicating the location of the alarm condition. In addition to the audible and visual alarm, all red lamps BBLS (see FIGURE 9) in all traffic signals BB located at intersection C are energized until the noncompliance situation is remedied, as by radio communication with the aircraft's pilot, and the traffic director has reset the alarm.

The traffic director may change the programmed route by rerouting stylus S through the display panel's illustrated network. In the event that the traffic director desires to erase the entire program, leaving the intersection with all stop light, i.e., energization of all red lamps BBLS, this may be accomplished by actuating a program erase switch PES with the magnetic stylus S. Program switches PS1 and PS2 of each intersection arm in the display panel serve, by means of control logic circuitry, to interpret the direction traced by stylus S and energize the appropriate display panel presence lights PL and the appropriate intersection traffic signals BB. Thus, for example, if program switch PS1 is actuated before program switch PS2, the control logic circuitry enters a program representative that an aircraft is to enter an intersection from the arm associated with these program switches. Conversely, if program switch PS2 is actuated before program switch PS1 is actuated, a program is entered for an aircraft to leave the intersection through the arm associated with these program switches. The fourth magnetic reed switch DES associated with each arm, but spaced transversely away from groove 306, serves as a detector erase switch so that, when armed, it is capable of de-energizing an aircraft presence light DLI or DLO associated with that intersection arm on the display panel. Thus, for example, if aircraft presence light DLO in the south arm is energized and no aircraft is present in the area of influence of loop detector LD at detector station DS1 in the south arm of the actual network, the traffic director may extinguish this false indication by actuating the detector erase switch DES associated with the display panels south arm. The detector erase switch DES must be armed by first actuating a detector reset switch so that a true presence signal indication is not erased inadvertently.

The display panels alarm lamp AL is energized to provide a flashing red signal whenever a programming error occurs and no aircraft is involved. Such a situation occurs, for example, when a program is entered at intersection C directing an aircraft to intersection B while at the same time a program already exists at intersection B directing another aircraft toward intersection C. The reason for the visual alarm only in such a situation, is that this condition exists quite frequently when the traffic director programs a completely new route. A second type of alarm provided is both a visual and audible alarm. That is, an alarm buzzer is energized at the same time that alarm lamp AL is flashing a red signal at the center of the intersection, or intersections, involved. The audible part of this alarm is actuated whenever an aircraft is involved. The following conditions actuate this alarm:

(1) When an aircraft runs a red light, that is, if an aircraft crosses the loop detector at detector station DS2 on its approach to an intersection when the traffic signal BB for the associated intersection arm is displaying a red signal, indicating a stop command.

(2) If a wrong turn is executed, that is, if an aircraft is given a directional command by a traffic signal BB and then enters the intersection but proceeds to leave the intersection in any direction other than the one to which the aircraft has been programmed.

(3) If a program is entered by the traffic director which would create a potential collision with a detected aircraft approaching the intersection in question; for example, if a program is entered for the west arm of the intersection for an aircraft to proceed to the south arm and an aircraft is already present in the south arm approaching the intersection.

(4) If a program is entered by the traffic director that would create a potential collision, thus, for example, if the traffic director enters a program for an aircraft to proceed from the west arm through the intersection and then to the south arm, and at the same time an aircraft from an interconnecting intersection is detected as leaving the connecting intersection in a northerly direction through the south arm of the programmed intersection.

Under any alarm situation; that is, whenever flashing red signal light lamp AL is energized, the appropriate traffic signals BB display all red signals at the intersection or intersections involved, stopping traffic flow. The program lights at the display panel, however, remain energized to assist the traffic director in determining the cause for the alarm. After the alarm situation has been remedied, the traffic director resets the alarm by means of a separate manual alarm reset switch. Once the alarms have been reset, a program may be re-entered on the intersection traffic signals BB. The manual alarm reset feature serves as an additional check on both the system and the traffic director to insure that the alarm situation has been corrected before authorization is given to an aircraft to proceed through the intersection in question.

The system also includes a priority circuit which serves to provide a clearance signal condition for active runways in the event that taxiways, or other active runways, cross the active runway in question. The priority circuit energizes all the traffic signals BB to display stop, i.e., red, signals for the cross traffic to the active runway in question. This circuit also energizes the active runway traffic signals to display a yellow, i.e., go, signal when the runway is clear for use.

Having thus described my invention, I claim:

1. A modular directional signal comprising:
a lens structure defining a diamond shaped lens signal area,
said lens structure including at least four signaling portions, each of said signaling portions being substantially in adjacent relationship with two other signaling portions, said signaling portions being of a configuration such that when two adjacent signaling portions are illuminated said illuminated signaling portions generally take the form of an arrowhead having a pointed portion being substantially located at the outer edge of the lens structure so that the illumination of combinations of two adjacent signaling portions provides four directional command signals within said signal area, and
a separately energized light source associated with each said signaling portion for illuminating the associated signaling portion to display a directional command.

2. A modular directional signal comprising:
a lens structure defining a lens signal area,
said structure being divided into a plurality of generally triangular lens modules each defining a portion of said signal lens area, at least one of said lens modules being substantially contiguous with another of said modules,
each said lens module being shaped as an arrowhead having a pointed end portion pointing in a different direction from that of said other modules;
a separately energized light source associated with each said module for illuminating the associated module to display a directional command;
said signal lens area is diamond shaped; and, said lens structure is equally divided into four triangular shaped lens modules having their 90° apexes in adjacent relationship so that separate illumination of the modules provides four different directional command signals and illumination of combinations of two adjacent modules provides four additional directional command signals within said signal area.

3. A modular directional signal as set forth in claim 2 including a second diamond shaped structure corresponding in shape with said first structure and facing in an opposing direction therefrom.

4. A modular directional signal as set forth in claim 3 wherein said second diamond shaped structure is divided equally into upper and lower triangular shaped portions, said upper portion having triangular shaped lens having its apex pointed upwardly, and a light source between said structures for illuminating said lens to display a directional command.

References Cited

UNITED STATES PATENTS

| | | | |
|---|---|---|---|
| 2,315,420 | 3/1943 | Harrington | 340—381 |
| 2,453,421 | 11/1948 | Dyer | 340—378 X |
| 2,967,298 | 1/1961 | Riggins et al. | 340—381 |
| 3,103,659 | 9/1963 | Edwards | 340—378.1 |
| 3,343,150 | 9/1967 | Orchard | 340—381 X |

JOHN W. CALDWELL, Primary Examiner

HAROLD I. PITTS, Assistant Examiner

U.S. Cl. X.R.

340—84, 107, 108, 109, 378